(12) United States Patent
Nishiura et al.

(10) Patent No.: US 8,733,486 B2
(45) Date of Patent: May 27, 2014

(54) BATTERY FOR ELECTRIC VEHICLE

(75) Inventors: Hisao Nishiura, Saitama (JP); Seiji Kato, Saitama (JP); Susumu Akutsu, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 233 days.

(21) Appl. No.: 13/219,897

(22) Filed: Aug. 29, 2011

(65) Prior Publication Data
US 2012/0048630 A1  Mar. 1, 2012

(30) Foreign Application Priority Data

Aug. 31, 2010 (JP) ................................. 2010-195037
Aug. 31, 2010 (JP) ................................. 2010-195038

(51) Int. Cl.
B60R 16/04 (2006.01)

(52) U.S. Cl.
USPC ........................................ 180/68.5; 180/220

(58) Field of Classification Search
USPC ...................................... 180/68.5, 65.1, 220
See application file for complete search history.

(56) References Cited

U.S. PATENT DOCUMENTS

| | | | | |
|---|---|---|---|---|
| 5,406,154 A | * | 4/1995 | Kawaguchi et al. | 310/67 R |
| 5,421,427 A | * | 6/1995 | Ogawa et al. | 180/220 |
| 5,577,747 A | * | 11/1996 | Ogawa et al. | 180/220 |
| 6,176,338 B1 | * | 1/2001 | Nakagawa et al. | 180/219 |
| 6,679,345 B2 | * | 1/2004 | Hirayama et al. | 180/65.31 |
| 7,117,966 B2 | * | 10/2006 | Kohda et al. | 180/68.5 |
| 7,931,110 B2 | * | 4/2011 | Nishiura et al. | 180/220 |
| 8,002,067 B2 | * | 8/2011 | Nishiura et al. | 180/220 |
| 8,167,070 B2 | * | 5/2012 | Takamura et al. | 180/68.5 |
| 8,376,075 B2 | * | 2/2013 | Sasage et al. | 180/68.5 |
| 8,443,926 B2 | * | 5/2013 | Kanno et al. | 180/220 |
| 2010/0163326 A1 | * | 7/2010 | Takamura et al. | 180/68.5 |
| 2011/0290578 A1 | * | 12/2011 | Nishiura et al. | 180/291 |
| 2012/0000720 A1 | * | 1/2012 | Honda et al. | 180/65.1 |
| 2012/0048630 A1 | * | 3/2012 | Nishiura et al. | 180/65.31 |
| 2012/0080254 A1 | * | 4/2012 | Tsukamoto et al. | 180/68.5 |
| 2012/0082881 A1 | * | 4/2012 | Tsukamoto et al. | 429/120 |
| 2012/0160579 A1 | * | 6/2012 | Taniguchi et al. | 180/65.1 |
| 2012/0181097 A1 | * | 7/2012 | Hatanaka et al. | 180/65.31 |
| 2013/0153323 A1 | * | 6/2013 | Tsukamoto et al. | 180/220 |
| 2013/0161107 A1 | * | 6/2013 | Tsukamoto et al. | 180/220 |
| 2013/0175102 A1 | * | 7/2013 | Tsukamoto et al. | 180/21 |
| 2013/0181675 A1 | * | 7/2013 | Kawasaki et al. | 320/109 |

FOREIGN PATENT DOCUMENTS

| | | |
|---|---|---|
| JP | 10-045075 A | 2/1998 |
| JP | 11-79045 A | 3/1999 |
| JP | 2000-108687 A | 4/2000 |
| JP | 2007-0081594 A | 8/2007 |
| JP | 2008-221976 A | 9/2008 |

* cited by examiner

*Primary Examiner* — Jeffery J Restifo
(74) *Attorney, Agent, or Firm* — Birch, Stewart, Kolasch & Birch, LLP

(57) ABSTRACT

An electric vehicle is provided with a swing arm one end of which is coupled to a swinging shaft and the other end of which supports a rear wheel. An electric motor is installed on the side of the other end of the swing arm and drives the rear wheel. The swing aim is provided with a housing space provided in the vicinity of the swinging shaft and a guide groove that positions the battery in the housing space, the battery is mounted inside the swing arm by fixing the battery positioned in the housing space via potting material. The housing space is provided with an opening for inserting the battery on the side of the electric vehicle and the battery is inserted and fixed into/to the housing space of the swing aim from the side of the electric vehicle.

20 Claims, 10 Drawing Sheets

BATTERY FOR ELECTRIC VEHICLE

CROSS-REFERENCE TO RELATED APPLICATIONS

The present application claims priority under 35 USC 119 to Japanese Patent Application Nos. 2010-195037 and 2010-195038 filed on Aug. 31, 2010 the entire contents of which are hereby incorporated by reference.

BACKGROUND OF THE INVENTION

1. Field of the Invention

This invention relates to a battery for an electric vehicle. More particularly, to a fixing structure when the battery is arranged in an electric vehicle provided with a swing arm.

2. Description of Background Art

For a structure for fixing a battery in an electric vehicle such as an electric motorcycle, a fuel cell motorcycle and a hybrid motorcycle, a structure is provided wherein one end of a swing aim is coupled to a swinging shaft and the other end of the swing arm supports a rear wheel. An electric motor for driving the rear wheel is installed on the side of the other end of the swing arm and a battery is arranged in a position in the vicinity of the swinging shaft of the swing arm. See, for example, JP-A No. 2008-221976.

Though it is described in JP-A No. 2008-221976 that the battery is arranged in a position in the vicinity of the swinging shaft of the swing arm, a concrete method of fixing to the swing arm is not disclosed. There is a need to improve the method of fixing the battery to the swung swing arm.

More specifically, when the battery is fixed to the mobile swing arm, it is desired that the battery is compactly mounted by possibly reducing the number of parts in fixing to reduce the weight.

SUMMARY AND OBJECTS OF THE INVENTION

According to an embodiment of the present invention, a battery for an electric vehicle is provided with a fixing structure wherein the number of parts is reduced and the weight can be reduced when the battery is fixed to a swing arm of the electric vehicle.

According to an embodiment of the present invention, a battery for an electric vehicle is installed to supply electric power to an electric motor (M) in the electric vehicle provided with a swing arm (30) with one end of which being coupled to a swinging shaft (19) and the other end of which supports a rear wheel (WR). The electric motor (M) is installed on the side of the other end of the swing arm (30) for driving the electric motor (M). The swing arm (30) is provided with a housing space (35) provided to the swing arm (30) in the vicinity of the swinging shaft and a guide groove (44) that positions the battery in the housing space. The battery (56) is mounted in the swing arm (30) by fixing the battery (56) positioned in the housing space via potting material. In addition, the housing space (35) is provided with an opening for inserting the battery on the side of the electric vehicle and the battery (56) is inserted and fixed into/to the housing space of the swing arm (30) from the side of the electric vehicle.

According to an embodiment of the present invention, the housing space (35) is provided with a cutout (38b) from which an end of the battery is exposed on the opposite side to the opening and the battery (56) is fixed in the housing space in a state in which a part of the battery (56) is exposed from the swing arm (30).

According to an embodiment of the present invention, a cover, formed by a lighter part than the material of the swing arm (30), is installed in place of the cutout (38b) of the housing space (35).

According to an embodiment of the present invention, the potting material is resin.

According to an embodiment of the present invention, the resin is resin coating and the battery (56) is press-fitted in the resin coating.

According to an embodiment of the present invention, the battery (56) is configured by a plurality of rectangular and plate-like battery cells and each cell is arranged with a longer side vertically directed.

According to an embodiment of the present invention, the battery (56) is configured by an aggregate of laminated battery cells packaged every cell.

According to an embodiment of the present invention, the board (50) is configured by a control board (50a) that mainly controls the electric motor (M) and a heating element board (50b) provided with a charging circuit for mainly charging the battery (56), the battery (56) and the board (50) are integrated and are inserted and fixed into/to the swing arm (30) in an integrated state.

According to an embodiment of the present invention, as a dedicated case for holding the battery (56) is not required by fixing the battery (56) positioned by the guide groove (44) in the housing space (35) via the potting material, the number of parts and the weight are reduced by utilizing the swing arm (30) itself for a case for holding the battery (56), securely fixing the battery (56) to the swing arm (30) and the housing space is configured to enable inserting the battery (56) from the opening on the side, the battery (56) can be attached and detached into/from the housing space (35) in a state in which the rear wheel (WR) is installed on the swing arm (30) and the enhancement of the operationability can be secured.

More specifically, as the battery consisting of a piece of heavy equipment that can be built from the rear side, ease in assembling the vehicle is enhanced and the battery (56) can be securely fixed to the swing arm (30), contributing to reducing the number of parts and the weight because the swing arm (30) is not required to be partially overhanged in accordance with a shape of the battery (56).

According to an embodiment of the present invention, the weight of the swing arm (30) can be reduced by providing the cutout (38b).

In addition, the effect of the heat radiation of the battery (56) can be enhanced by exposing the part of the battery (56) from the swing arm (30).

According to an embodiment of the present invention, the weight can be reduced by protecting the battery (56) which is an exposed part by installing the cover and forming the cover by the lighter part than the material of the swing arm (30) and the relative weight can be reduced.

According to an embodiment of the present invention, the weight of the battery (56) can be reduced and can be firmly fixed respectively by using resin for the potting material.

According to an embodiment of the present invention, as pressure is applied to the resin coating by press-fitting the battery 56 in the resin coating and the resin coating can be easily inserted into its clearance, time in which the resin coating is hardened can be reduced.

According to an embodiment of the present invention, the width of the swing arm (30) can be reduced by enabling vertically arranging a longer side of the battery cell configuring the battery (56).

According to an embodiment of the present invention, the handling can be facilitated by using the battery (56) configured by the aggregate of the cells.

According to an embodiment of the present invention, as the battery (56) and the board (50) are inserted and fixed into/to the swing arm (30) in the integrated state, a dedicated fixing part in fixing can be reduced.

According to an embodiment of the present invention, the battery (56) is configured by a plurality of rectangular plate-like battery cells and the guide groove (44) of the housing space (35) is provided for every cell.

According to an embodiment of the present invention, a relief passage for relieving high pressure applied by the battery (56) is formed by potting material that fixes the battery (56) by engaging a sealing plug (45) with a through hole (38a) bored in the housing space (35) and removing the sealing plug (45) after the potting material is injected into the housing space.

According to an embodiment of the present invention, a board (50) is arranged in the vicinity of the swing arm (30), is configured by a control board (50a) for mainly controlling the electric motor (M) or a heating element board (50b) provided with a charging circuit for mainly charging the battery (56) and is fixed by the potting material.

According to an embodiment of the present invention, the board (50) is arranged on the side or on the back of the swing arm (30).

According to an embodiment of the present invention, the board (50) is fixed to the battery (56) and is arranged in the vicinity of the swing arm.

According to an embodiment of the present invention, the plurality of battery cells configuring the battery (56) are arranged with each longer side vertically directed.

According to an embodiment of the present invention, the housing space (35) of the swing arm (30) is provided with an opening on the upside.

According to an embodiment of the present invention, the heating element board (50b) is fixed to the control board (50a) on the rear side in a vehicle body of the control board (50a), the control board (50a) and the heating element board (50b) are encircled by the potting material and a part of exothermic members on the heating element board (50b) is exposed out of the potting material.

According to an embodiment of the present invention, the battery (56) is configured by the aggregate of laminated battery cells packaged every cell.

According to an embodiment of the present invention, each battery cell can be fixed by each guide groove (44).

According to an embodiment of the present invention, the relief passage for relieving high pressure applied by the battery (56) can be formed by hardening the potting material.

According to an embodiment of the present invention, a dedicated part for fixing the board (50) can be reduced by configuring the board (50) by the control board (50a) or the heating element board (50b) and fixing it with the potting material.

According to an embodiment of the present invention, the number of parts such as wiring can be reduced by arranging the board (50) on the side or on the back of the swing arm (30) and closely arranging parts formed on the board (50) and related to the battery (56). In addition, the wiring path between the battery (56) and the electric motor (M) can be reduced.

According to an embodiment of the present invention, the dedicated part for fixing the board (50) can be reduced by fixing the board (50) to the battery (56) and the board (50) can be securely arranged in the vicinity of the swing arm.

According to an embodiment of the present invention, as pressure is applied to the resin coating and the resin coating fills clearance by press-fitting the battery (56) in the resin coating, the battery can be firmly fixed.

According to an embodiment of the present invention, the mounting of the battery is facilitated by providing the opening of the housing space (35) on the upside, the swing arm (30) can replace the part equivalent to the conventional type battery case, and the dedicated part and the weight can be reduced.

According to an embodiment of the present invention, the effect of heat radiation can be enhanced by exposing a part of the exothermic members on the heating element board (50b) out of the potting material.

According to an embodiment of the present invention, work for attaching to the swing arm (30) and work for replacing the batteries are facilitated by using the laminated battery configured by the cell aggregate in addition to high energy density and the enhancement of heat radiation performance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
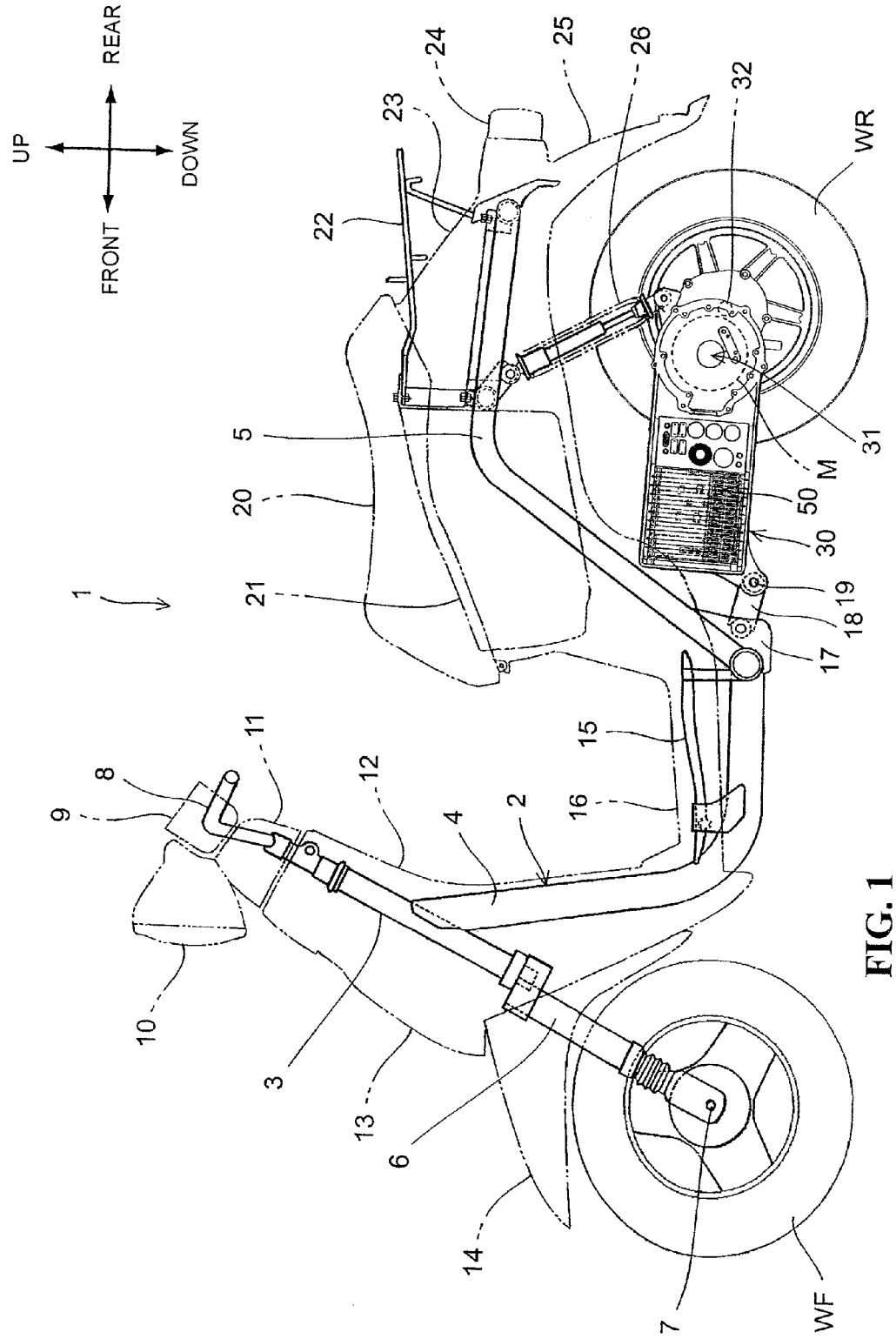
FIG. 1 is a left side view showing an electric motorcycle in which a battery for an electric vehicle according to the present invention is mounted.

Referring to the drawings, a preferred embodiment of the present invention will be described in detail below. FIG. 1 is a side view showing an electric motorcycle 1 equivalent to one embodiment of the present invention, the electric motorcycle 1 is a scooter-type saddle-ride type vehicle having a low deck 16, and a rear wheel WR is driven by an electric motor M housed in a swing arm (a unit swing) 30. A head pipe 3 that rotatably journals a stem shaft (not shown) is connected to the front of a body frame 2. A steering handlebar 8 covered with a handlebar cover 11 is connected to an upper part of the stem shaft and a pair of right and left front forks 6 that turnably journal a front wheel WF via an axle 7 are connected to a lower part of the stem shaft.

The body frame 2 is provided with a main pipe 4 extending downwardly from the rear of the head pipe 3 and a rear frame 5 coupled to a rear end of the main pipe 4 and extending upwardly in the rear of a vehicle body. A floor frame 15 that supports the low deck 16 is attached to the main pipe 4 located on the downside of the low deck 16. A pair of right and left pivot plates 17 are attached to a part in which the main pipe 4 and the rear frame 5 are connected.

The swing arm 30 is a cantilevered type provided with an arm only on the left side in a direction of vehicle width and is swingably journaled to the body frame 2 via a swinging shaft 19 that pierces a link 18 attached to the pivot plate 17. The swing arm 30 is made of metal such as aluminum and has structure a part of which is hollow, the electric motor M is housed in the vicinity of an axle 32, and a board 50 as a control device is arranged in front of the electric motor M in the vehicle body. A battery 56 (see FIG. 3) that supplies electric power to the electric motor M is arranged on the right side in the direction of vehicle width of the board 50.

The rear wheel WR is rotatably journaled to the swing arm 30 via the axle 32 and a rear end of the swing arm 30 is suspended from the rear frame 5 via a rear shock absorber 26. A housing box 21 that functions as a trunk is arranged under a seat 20 with the housing box held between the pair of right and left rear frames 5.

The main pipe 4 of the body frame 2 is covered with a front cowl 13 on the front side of the vehicle body and a leg shield 12 on the rear side of the vehicle body. Meters 9 are arranged in an upper part of the handlebar cover 11 and a headlamp 10 is attached on the front side in the vehicle body of the meters 9. A front fender 14 that covers the front wheel WF is fixed to each upper part of the front forks 6.

The outside in the direction of vehicle width of the rear frame 5 is covered with a seat cowl 23 and a tail lamp 24 is attached to a rear end of the seat cowl 23. A rear carrier 22 connected to the rear frame 5 protrudes on the upside of the tail lamp 24 and a rear fender 25 that covers the upside of the rear of the rear wheel WR is provided on the downside of the tail lamp 24.

Figure 2:
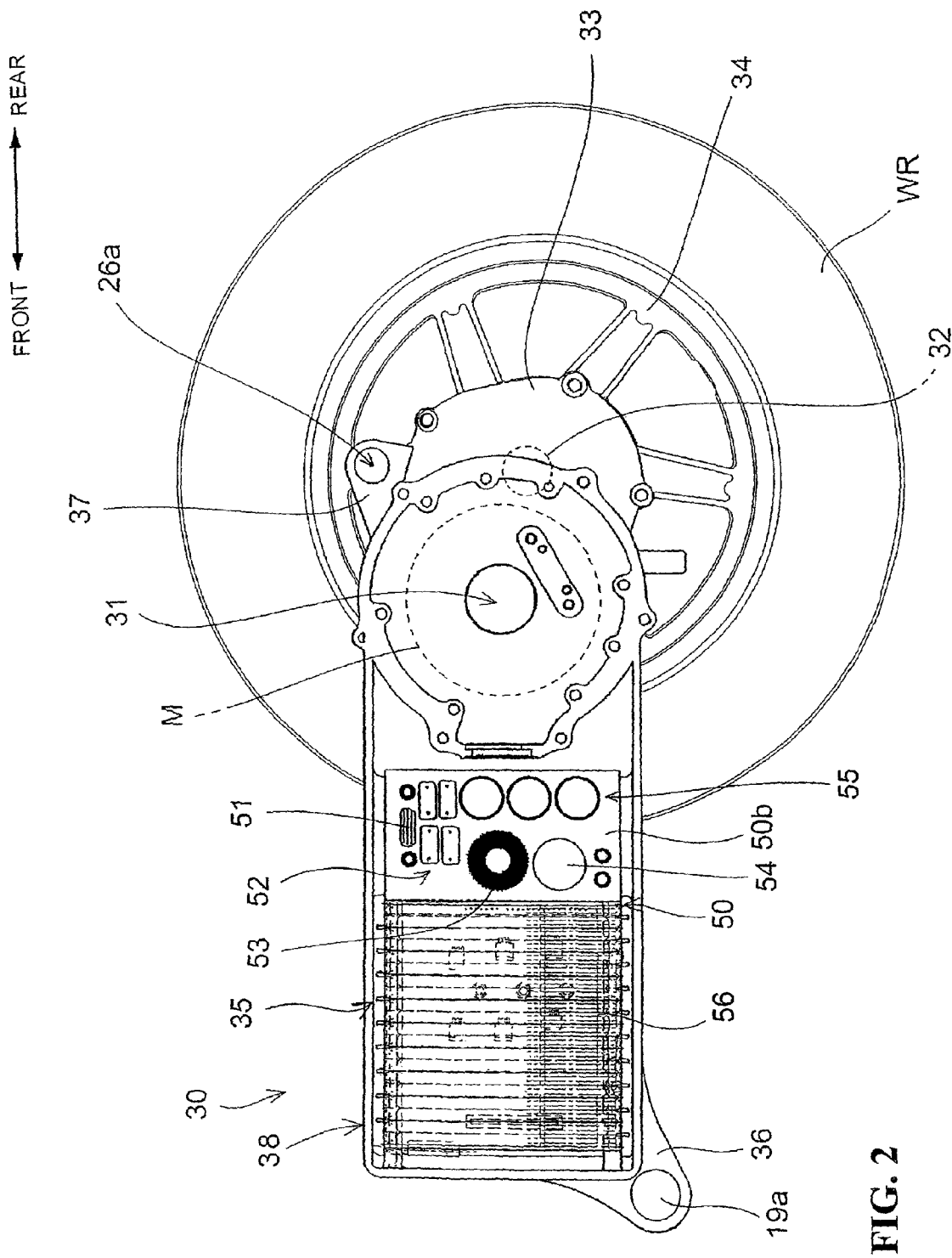
FIG. 2 shows one example of an embodiment of the battery for the electric vehicle according to the present invention and is a left side view showing a swing arm in which the battery for the electric vehicle is arranged.
Figure 3:
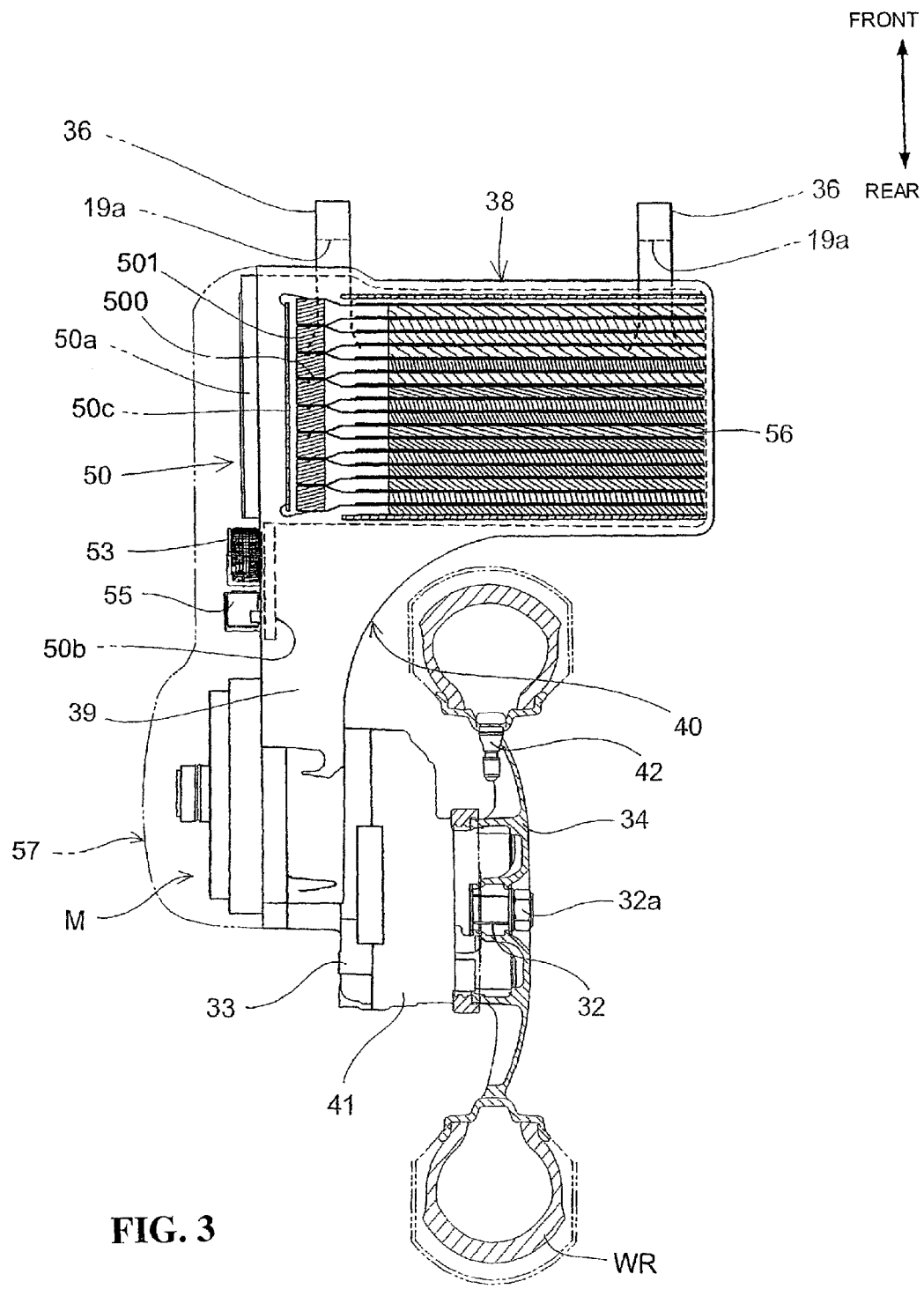
FIG. 3 is a top view showing the swing arm in which the battery for the electric vehicle shown in FIG. 2 is arranged.
Figure 4:
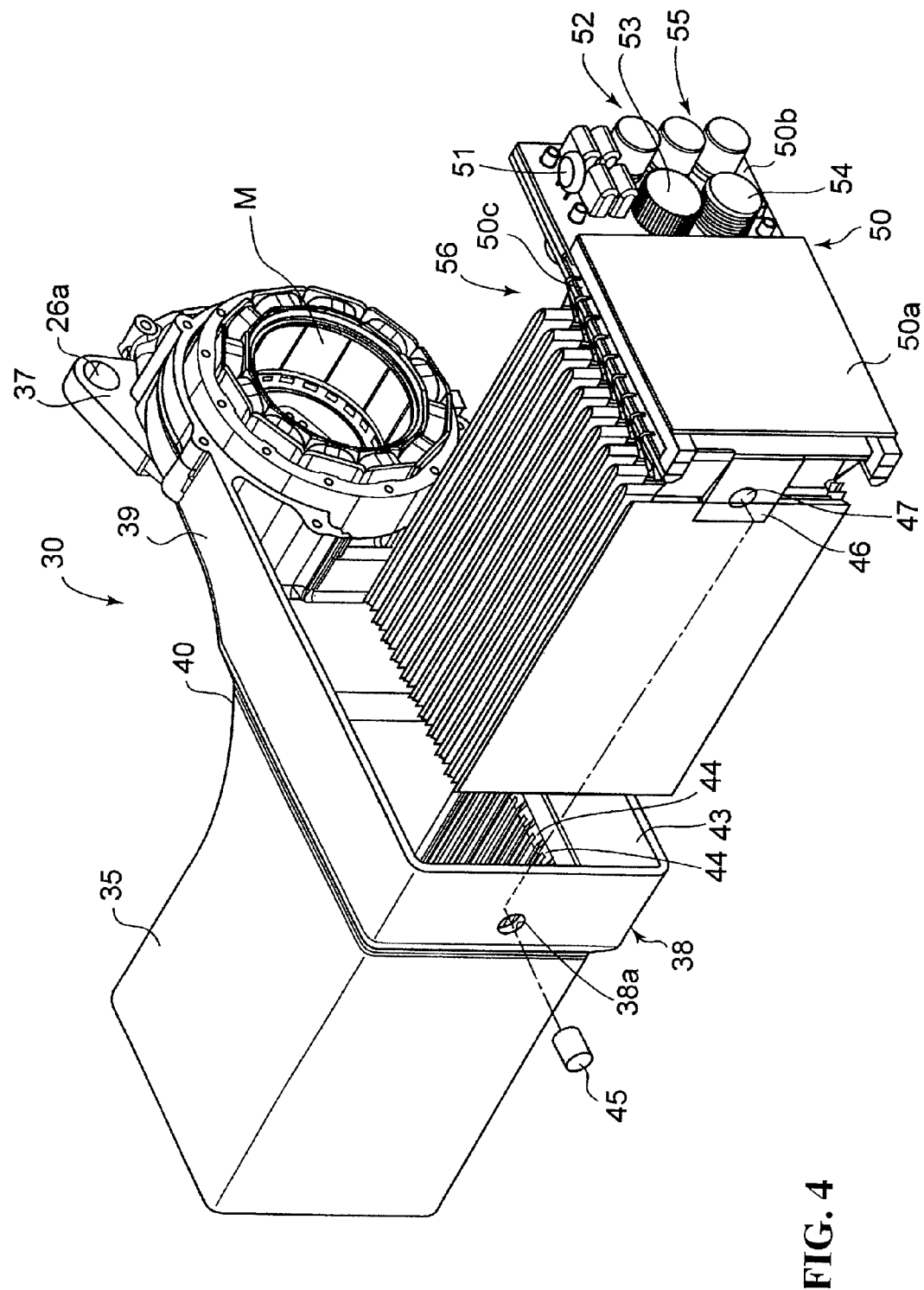
FIG. 4 is an exploded perspective view showing the swing aim.

FIG. 2 is an enlarged side view showing the swing arm 30 that mounts the battery for an electric vehicle. FIG. 3 is a top view showing the swing arm 30 and FIG. 4 is an exploded perspective view showing the swing arm 30. The same reference numeral as the above-mentioned one shows the same or the similar part. As described above, the swing arm 30 has structure which is made of metal such as aluminum and a part of which is hollow and is the cantilevered type that supports the rear wheel WR with an arm part 39 on the left side in the direction of vehicle width. A pair of right and left pivot flanges 36 in which each through hole 19a for the swinging shaft 19 (see FIG. 1) is formed are provided in a lower part on the front side in the vehicle body of the swing arm 30.

A housing space 35 in which a plurality of battery cells 56 are inserted is formed on the upside in the vehicle body of the pivot flange 36, and a wide case 38 that forms a crust of the housing space 35 and the aim part 39 are continuously formed via a curved part 40. A swing arm cover 57 made of a thin plate that integrally covers the board 50 and the electric motor M is attached on the left side in the direction of vehicle width of the housing space 35 and the arm part 39.

Reduction gears cases 33, 41 in which reduction gears that reduces the rotation of the electric motor M are housed are attached to a rear end of the arm part 39. The axle 32 protrudes toward the right side in the direction of vehicle width from the reduction gears case 41 and a wheel 34 of the rear wheel WR is fixed to an end of the axle 32 by a nut 32a. A tubeless tire is used for the rear wheel WR and an air bulb 42 is provided to the wheel 34. A mounting flange 37 in which a through hole 26a for attaching the rear cushion 26 (see FIG. 1) is formed is provided to the reduction gears case 33.

The rectangular housing space 35 is integrally formed inside in the vicinity of the swinging shaft on the side of one end of the swing arm 30. As for the housing space 35, when the swing arm 30 is installed in the electric vehicle, the side of an opening (an opening) of the housing space 35 is located on the side of the electric vehicle and the battery 56 can be inserted from the side of the opening.

The battery for the electric vehicle is mounted in the electric motorcycle by being integrated with the board 50, being inserted and fixed into/to the housing space 35 of the swing arm 30 in an integrated state and being directly installed in the swing arm 30 without using a dedicated case.

The battery 56 in this embodiment is provided with module structure that enables acquiring predetermined high voltage by connecting plural battery cells. The plate-like battery cells 56 are housed in the substantially rectangular parallelepipedic housing space 35 formed in the wide case 38 in a state in which they are laminated with their flat surfaces directed in a longitudinal direction of the vehicle body. The battery 56 is a heavy piece of equipment and is arranged in the swing arm 30 close to the swinging shaft 19, the moment of inertia when the swing arm 30 is swung is reduced, and smooth swinging operation is enabled. In addition, each battery cell is packaged in a soft laminate sheet every cell. According to the laminated type battery, high energy density and the enhancement of heat radiation performance can be expected and in addition, work for attaching to the swing arm 30 and the work for replacing batteries are facilitated.

Figure 5:
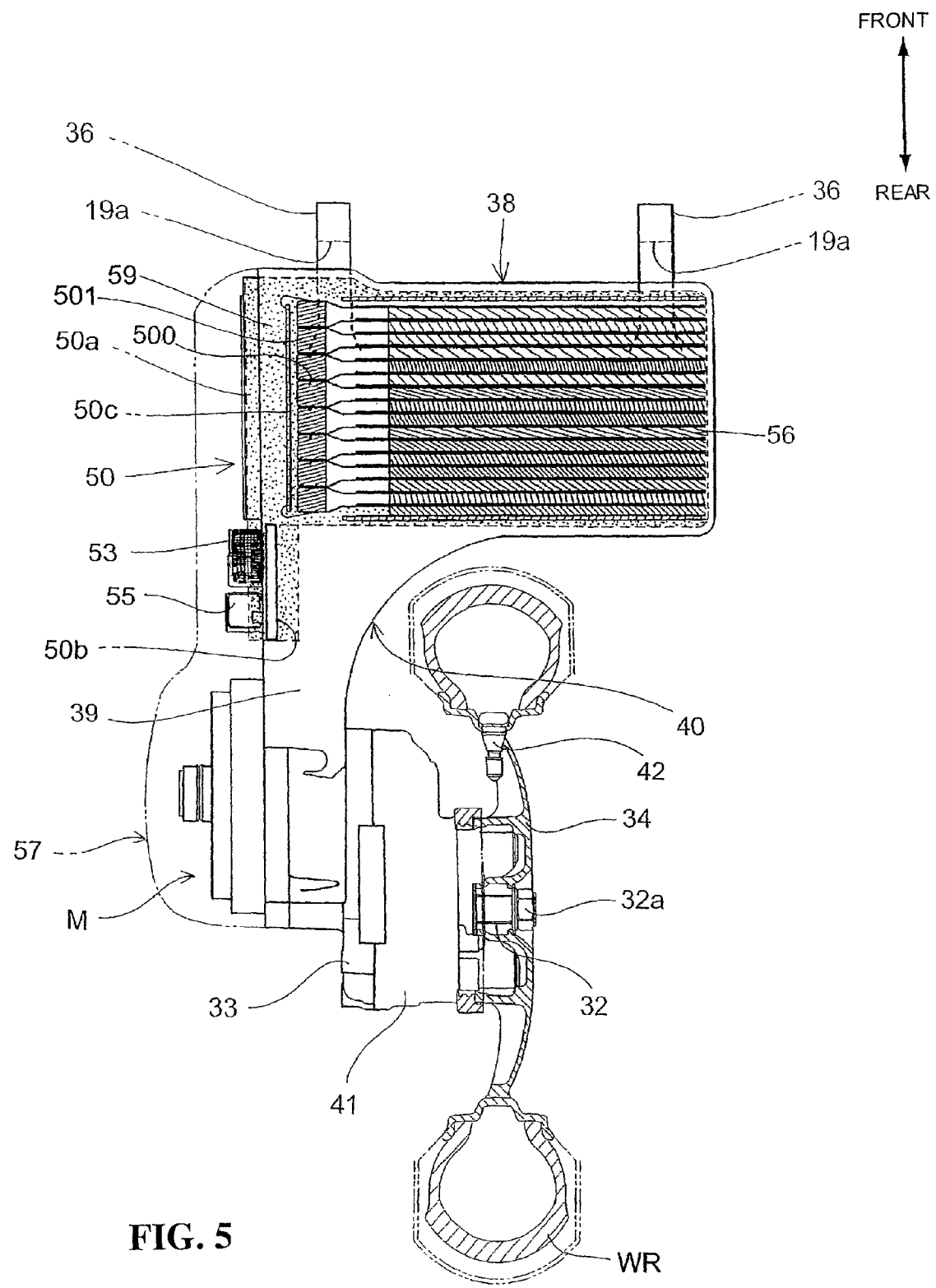
FIG. 5 is a top view showing the swing arm in a state after a potting process.

The board 50 as a control device in this embodiment is closely arranged on the left side in the direction of vehicle width of the battery 56. The board 50 is configured by a control board 50a, a heating element board 50b and an aluminum board 50c and the boards are arranged with respective flat surfaces directed in the direction of vehicle width. The control board 50a is closely arranged on the left side in the direction of vehicle width of the battery 56 and the heating element board 50b is coupled on the rear side of the vehicle body of the control board 50a. As illustrated in FIG. 5, the heating element board (50b) is fixed to the control board (50a) on the rear side in the vehicle body of the control board (50a). The aluminum board 50c is closely arranged on the left side in the direction of vehicle width of the battery 56.

Sponge rubber 501 has a predetermined thickness and is arranged between the battery 56 and the aluminum board 50c. Plural slits for inserting a plate-like terminal provided at a left end of each battery cell are formed in the sponge rubber 501. A position of the plate-like terminal is prescribed by inserting the plate-like terminal 500 into each slit. According to the sponge rubber 501, no potting material infiltrates into the rubber sponge, as a result, the use of the potting material 59 in a potting process described later is reduced, and the swing arm 30 can be lightened. The aluminum board 50c is arranged close to the sponge rubber 500.

Elements wherein the heat capacity of which is small such as a signaling element and a semiconductor (FET) are mainly mounted on the control board 50a. In addition, elements wherein a calorific value of which is large such as a thermistor 51, a group of input-output filters 52 for a battery charger, a capacitor (a PFC circuit) 53 for improving a battery charger power factor, a capacitor (an AC-DC transformer) 54 for converting AC to DC in the battery charger and a group of various transformers (DC-DC transformers) 55, that is, heating elements are mounted on the heating element board 50b. Semiconductor elements and others wherein a calorific value of which is smaller, compared with that of the heating elements mounted on the heating element board 50b are arranged on the aluminum board 50c.

A thermal load applied to another element by the heat of the heating elements can be reduced by providing the heating element board 50b on which only the heating elements having a large calorific value are centralized as described above. A degree of freedom in laying out the pivot flange 39, the through hole 19a and others can be enhanced by isolating the heating elements from another control elements.

Each battery cell configuring the battery 56 is fixed to the control board 50a that control the electric motor M and the control board 50a is arranged in the vicinity of the swing arm.

The battery 56 is charged and voltage from the battery 56 is supplied to the control board 50a by electrically connecting circuits of the control board 50a and each battery cell, and control over the driving of the electric motor M is enabled.

In addition, the thermal effect of the heating elements can be prevented from being applied to the control board 50a located on the upstream side in a traveling direction of the vehicle body by arranging the heating element board 50b on the rear side in the vehicle body of the control board 50a. Further, the thickness in the direction of vehicle width can be reduced by arranging the control board 50a outside the battery 56 in the direction of vehicle width. As the heating element board 50b is arranged in a position in which the board is overlapped with the rear wheel WR in a side view of the vehicle body, a space formed between the battery 56 and the electric motor M is effectively utilized and the heating elements can be arranged, and the swing arm can be prevented from being long too.

As shown in FIG. 4, the battery 56 is substantially in a parallelepipedic shape which is longer in the direction of vehicle width by laminating a predetermined number in the longitudinal direction of the vehicle body and is housed in the housing space 35 of the wide case 38. A guide groove 44 for housing each plate-like battery cell in each predetermined position is formed on an inside face of the housing space 35.

As for the guide groove 44, the side of each cell is fitted into the guide groove 44 and the position of each cell can be fixed by forming a plurality of grooves corresponding to each battery cell along an inserted direction of the battery 56 on a top face and a bottom inside the housing space 35 when each battery cell configuring the battery 56 is housed. A dedicated part for holding the cell is reduced and the whole housing space can be compacted by providing the guide groove 44.

A through hole 38a wherein a sealing plug 45 is engaged is formed in the wide case 38. In the meantime, a through hole 47 wherein the sealing plug 45 is engaged is formed in a coupling plate 46 that couples the battery 56 and the board 50 on the front side in the vehicle body. The sealing plug 45 and the through holes 38a, 47 are used in the resin potting process performed in the assembly of the swing arm 30. According to the potting process, the battery 56 and the board 50 are physically fixed to the swing arm 30, the board 50 is insulated and isolated, and further, the heat radiation performance of each part is enhanced.

The potting process is executed by injecting potting material 59 made of liquid resin hardened according to the elapse of time into the circumference of the battery 56 with the opening of the wide case 38 directed upward after positioning is performed by inserting the battery 56 and the board 50 into the wide case 38 and engaging the sealing plug 45 with the through holes 38a, 47. The potting material 59 is injected so that it covers the control board 50a and the aluminum board 50c as shown in FIG. 5 and covers a part of the side of a surface on which the capacitor 53 and the group of various transformers 55 and others respectively mounted on the exothermic board 50b are mounted. The potting material 59 is also provided with a function for enhancing the heat radiation performance of the battery 56 and others.

More specifically, the control board (50a) and the heating element board (50b) are encircled by the potting material by the potting process and a part (the upside) of the heating elements (the capacitor 53, the group of various transformers 55 and others) formed on the heating element board (50b) is exposed with the potting material.

When the sealing plug 45 is removed after the potting material 59 is hardened, a communicating hole for communicating with the inside and the outside of the wide case 38 is formed in a position in which the sealing plug 45 is located. According to the communicating hole, even if gas is exhausted from the battery 56, the gas is smoothly exhaust outside and the rise of pressure in the swing arm 30 can be prevented.

More specifically, a relief passage for relieving high pressure that leads air pressure (for relieving high pressure) when the temperature turned high temperature of the atmosphere of the battery rises outside can be formed by the potting material and a dedicated member for forming the relief passage can be reduced.

The potting material injected into the housing space 35 from its circumference fills a spatial circumference of the battery 56 housed in the housing space 35 and a position of the battery 56 is fixed via the potting material in the housing space 35 by hardening the potting material in a state in which the potting material exists in at least the spatial circumference including a part in which an upper part of the cell is coupled to the control board 50a in the housing space 35. In this state, the side of the opening of the housing space 35 is covered with the swing arm cover 57 that functions as a lid.

According to this structure, the battery 56 can be integrated with the swing arm 30 by fixing the battery 56 positioned in the housing space 35 via the potting material. A dedicated fixing part can be reduced by fixing the control board 50a together with the battery (each battery cell) 56 with the potting material.

For the potting material, resin for example can be used to lighten and firmly fix the battery 56. For the quantity of the potting material, the potting material is not necessarily required to fill all circumferential space of the battery cell and has only to fill clearance equal to or larger than ⅓ of the circumferential space of the battery cell. This is enough quantity to securely fix the position of each battery cell in the housing space 35, excessive filling is prevented, and energy is saved.

In the above-mentioned example, after the battery 56 is inserted into the housing space 35 and is arranged, the potting material which is resin is injected, however, the battery 56 may be also fixed in the housing space 35 by putting resin coating of suitable quantity in the housing space 35 beforehand, press-fitting the battery 56 in the resin coating so that the resin coating fills the space and afterward, hardening the resin coating.

As pressure is applied to the resin coating and clearance is filled with the resin coating by press-fitting each battery cell of the battery 56 in the resin coating, the battery can be firmly fixed.

In the above-mentioned example, each of the plurality of battery cells configuring the battery 56 is in the shape of a rectangle longer in a direction in which the battery 56 is inserted, however, the housing space 35 may be also formed so that it can be arranged with a longer side of the battery cell vertically directed.

In this case, the width of the swing arm 30 can be reduced and more particularly, the width of basic dimensions of the swing arm 30 can be prevented from being increased.

According to the above-mentioned configuration of the battery for the electric vehicle, as the side of the opening (the opening) of the housing space 35 is located on the side of the electric vehicle and the housing space is configured so that the battery 56 can be inserted from the side of the opening, the battery 56 can be detached from the housing space 35 with the rear wheel WR installed on the swing arm 30.

In addition, the number of parts and the weight can be also reduced, securely fixing the battery 56 to the swing arm 30 by requiring no dedicated case for holding the battery 56 and utilizing the swing arm 30 itself for a case for holding the battery 56.

As the structure in which the battery 56 as a piece of heavy equipment can be built later is adopted, it is not required to partially overhang the swing arm 30 in accordance with a shape of the battery 56, enhancing ease in assembling the vehicle and the battery can be securely fixed to the swing arm 30, contributing to reducing the number of parts and the weight.

As the swing arm 30 can be used for a radiator by directly fixing the battery 56 to the swing arm 30, the cooling effect of the battery 56 can be enhanced.

In addition, the whole battery unit can be compacted by simplifying structure for mounting the battery 56 and a degree of freedom for another configuration in design such as the arrangement of electric equipment can be enhanced.

Figure 6:
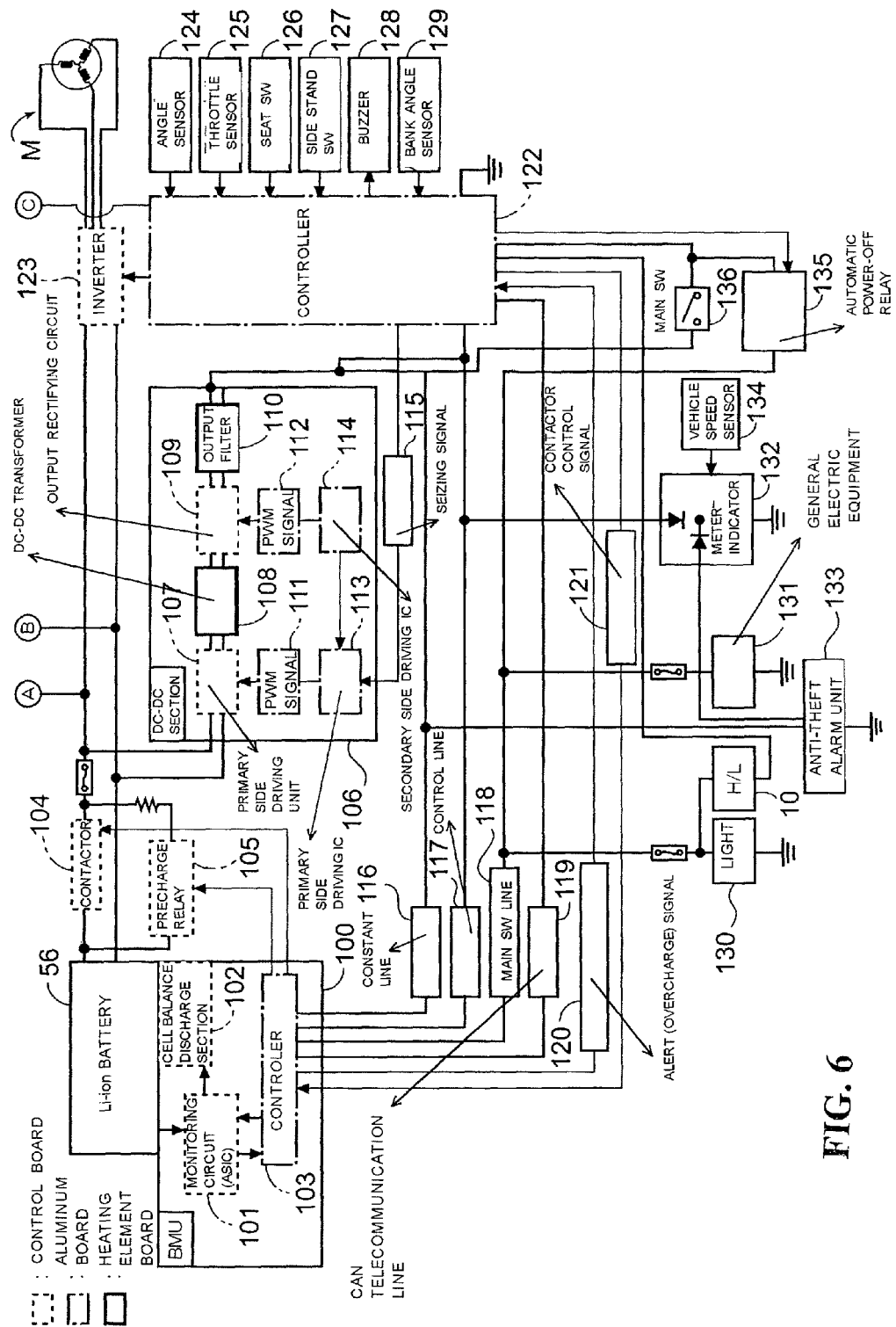
FIG. 6 is a block diagram showing the whole configuration of an electric system applied to the electric motorcycle.
Figure 7:
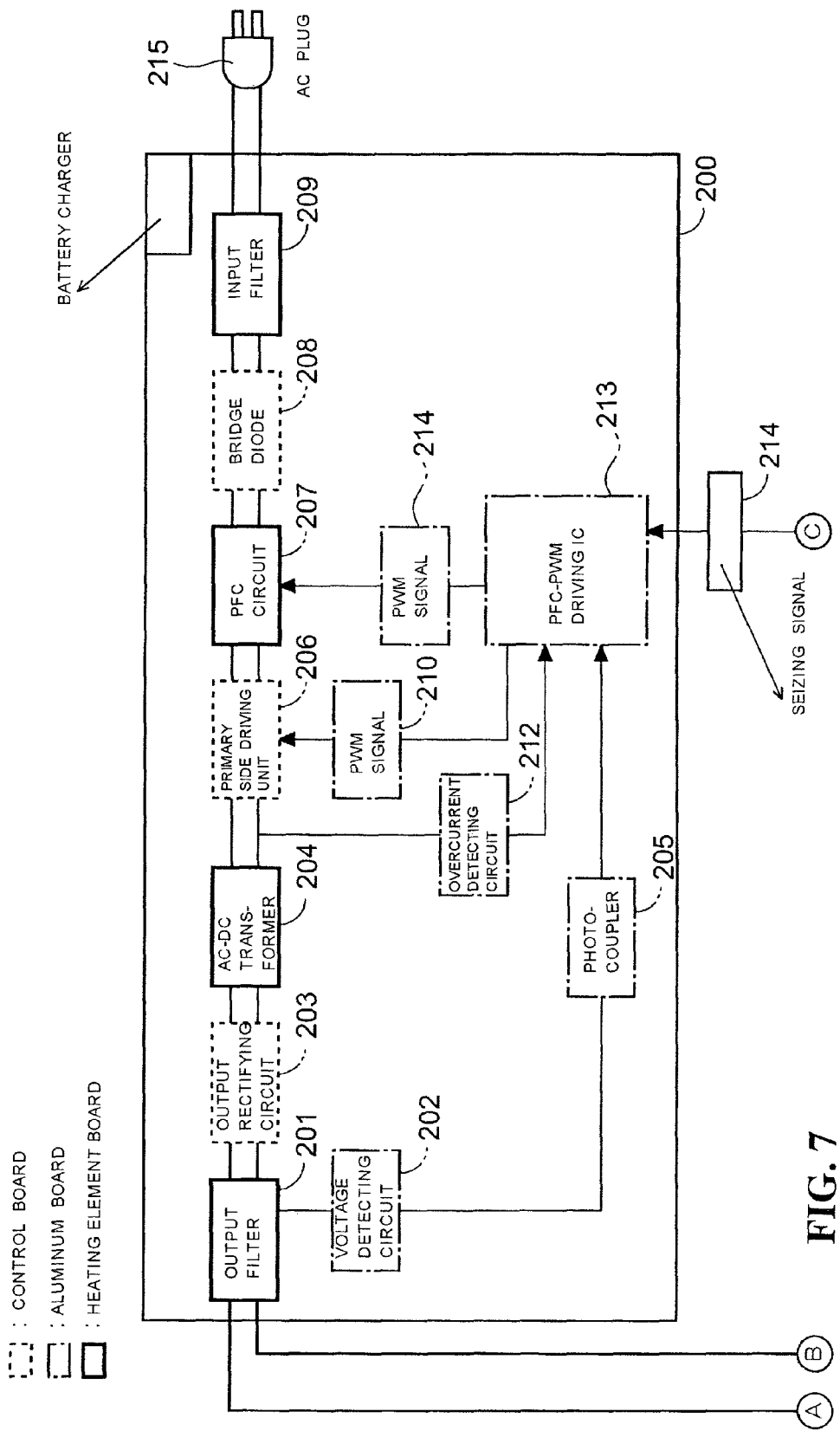
FIG. 7 is a block diagram showing the configuration of a battery charger in the electric system applied to the electric motorcycle.

FIGS. 6 and 7 are block diagrams showing the configuration of an electric system applied to the electric motorcycle 1. The same reference numeral as the above-mentioned one denotes the same or the similar part. FIG. 7 shows a component circuit of only the battery charger and FIG. 6 shows the whole configuration except it. In FIGS. 6 and 7, elements mounted on the control board 50*a* are shown by a broken line, elements mounted on the aluminum board 50*c* are shown by an alternate long and short clash line, and elements mounted on the heating element board 50*b* are shown by a full line.

On the control board 50*a*, the elements in which small current for a control signal flows are mounted. These elements hardly generate heat and the control board 50*a* is formed by a glass epoxy board. In addition, the element in which large current flows and which cannot radiate heat by themselves are mainly mounted on the aluminum board 50*c*. These electronic components are a semiconductor element such as FET and a diode, a resistor and a film capacitor for example and their heat radiation performance is enhanced by being mounted on the aluminum board 50*c* having a high thermal conductivity. Further, large-sized electronic components in which large current flows and which can radiate heat by themselves are mainly mounted on the heating element board 50*b*. These electronic components are an inductor, a transformer and an electrolytic capacitor for example and heat radiation performance is enhanced by arranging the heating element board 50*b* in a position hardly influenced by the heat of the battery.

In the block diagrams shown in FIGS. 6 and 7, an input filter 209 and an output filter 201 (equivalent to the group of input-output filters 52) of the battery charger 200, the PFC circuit 207 (equivalent to the capacitor 53 for improving the battery charger power factor), the AC-DC transformer 204 (equivalent to the capacitor 54 for converting AC to DC in the battery charger), the DC-DC transformer 108 (equivalent to the group of various transformers 55) in a DC-DC section 106 and an output filter 110 are mounted on the heating element board 50*c*.

As shown in FIG. 6, the battery 56 which is a lithium ion battery is electrically connected to the input side of an inverter 123 via a contactor 104 and the output side of the inverter 123 is connected to the electric motor M by a three phase alternating line. A precharge relay 105 that prevents the steep rise of supply current is connected in parallel with the contactor 104 to which on-off control by a mechanical contact operated by electromagnetic force is applied.

In a battery management unit (BMU) 100, a circuit (ASIC) 101 for monitoring the voltage, the temperature and others of the battery 56, a cell balance discharge section 102 for correcting dispersion in the capacity of the battery cell and a controller 103 that controls these are included.

Between the controller 103 in the BMU 100 and a controller 122 as a control device that controls the inverter 123, a constant line 116, a control line 117, a main switch line 118 and a CAN telecommunication line 119 are arranged. An alert signal 120 for alerting overcharge is transmitted from the controller 103 in the BMU 100 and a contactor control signal 121 is transmitted from the controller 122 for the inverter 123.

Signals from an angle sensor 124 that detects a rotation angle of the electric motor M, a throttle sensor 125 that detects the quantity in which a throttle lever is operated by a rider, a seat switch (SW) 126 that detects whether the rider is seated on the seat 20 or not, a side stand switch (SW) 127 that detects whether a side stand (not shown) of the electric vehicle 1 is stored or not and a bank angle sensor 129 that detects the inclination (an angle of a bank) of the electric vehicle are input to the controller 122 for the inverter 123. A buzzer 128 as a warning device is operated according to an operating signal from the controller 122 when the overdischarge of the battery 56 is detected.

The constant line 116 is connected to the DC-DC section 106 that converts large current supplied from the battery 56 to current for control. In the DC-DC section 106, a primary side driving unit 107, the DC-DC transformer 108, an output rectifying circuit 109, the output filter 110, primary side driving IC 113 that supplies a PWM signal to the primary side driving unit 107 and secondary side driving IC 114 that supplies a PWM signal to the output rectifying circuit 109 are included. A seizing signal 115 is supplied to the primary side driving IC 113 from the controller 122. Each one end side of an anti-theft alarm unit 133 and a main switch (SW) 136 is connected to the constant line 116.

The control line 117 is connected to the controller 122 for the inverter 123. One end of a meter indicator 132 as an operation indicating lamp of the anti-theft alarm unit 133 is connected to the control line 117. A vehicle speed sensor that detects vehicle speed is connected to the meter indicator 133 and the meter indicator 133 functions as a speed warning lamp when vehicle speed exceeds a predetermined value.

A light 130 such as a blinker, the headlamp 10 and general electric equipment 131 such as a fan for cooling the battery are connected to the main switch line 118. An end of the main switch line 118 is connected to an automatic power-off relay 135 that enables the operation of the headlamp 10 and others under a predetermined condition even if the main SW 136 is turned off.

As shown in FIG. 7, input-output lines (A, B) of direct current which are connected to the battery 56 and an AC plug 215 connected to commercial AC power supply and others are connected to the battery charger 200. In the battery charger 209, the input filter 209, a bridge diode 208, the PFC circuit 207 as a power factor improving circuit, a primary side driving unit 206, the AC-DC transformer 204, an output rectifying circuit 203 and the output filter 201 are included. A signal of an overcurrent detecting circuit 212 arranged between the primary side driving unit 206 and the AC-DC transformer 204 is input to PFC-PWM driving IC 213 and in the meantime, a signal of a voltage detecting circuit 202 connected to the output filter 201 is input to the PFC-PWM driving IC 213 via a photocoupler 205. The PFC circuit 207 and the primary side driving unit 206 are driven by PWM signals 210, 214 output from the PFC-PWM driving IC 213. A seizing signal 214 (C) from the controller 122 for the inverter 123 is input to the PFC-PWM driving IC 213.

Figure 8:
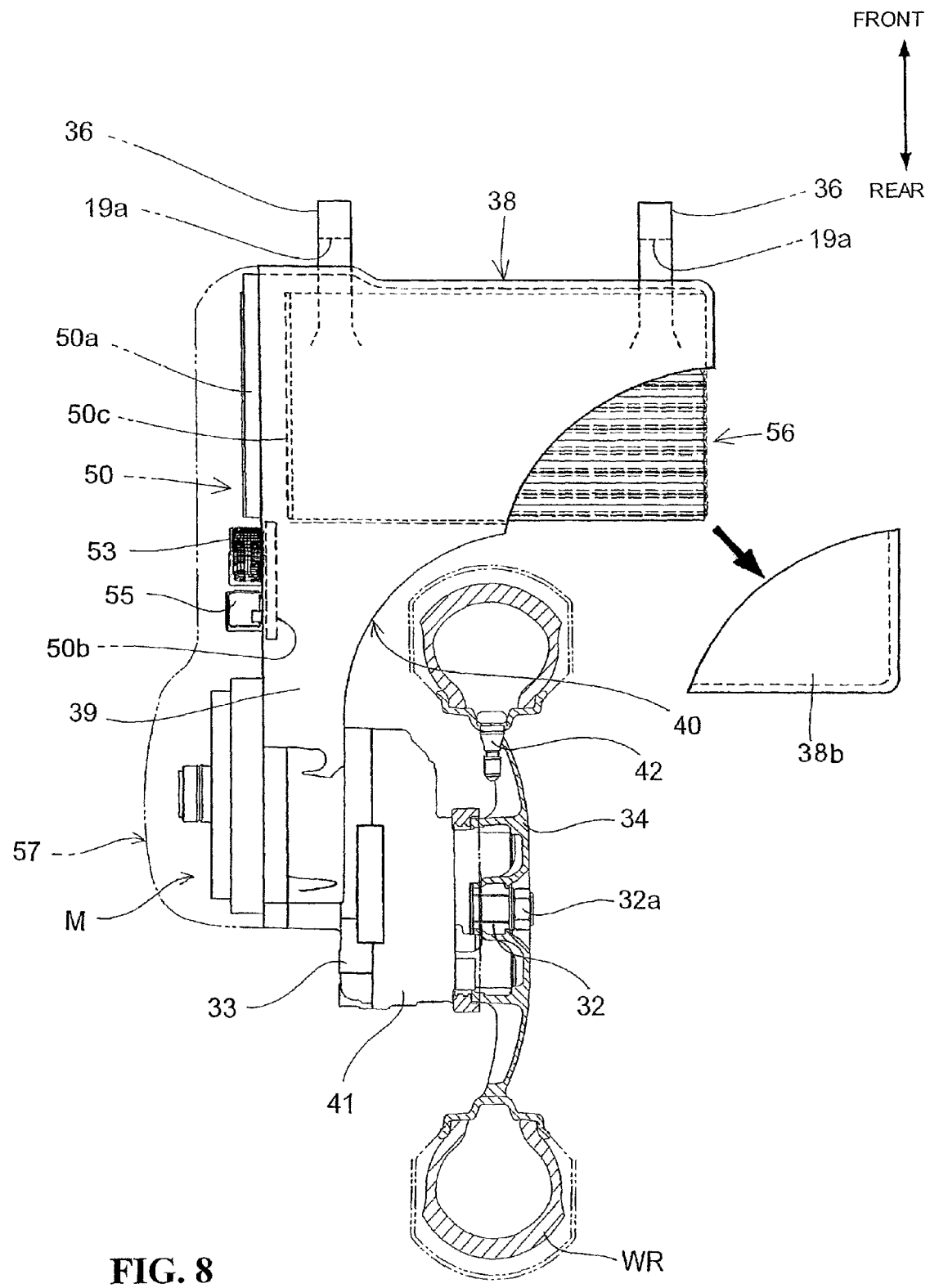
FIG. 8 shows another embodiment of the battery for the electric vehicle according to the present invention and is a top view showing the swing arm in which the battery for the electric vehicle is arranged.

FIG. 8 shows one example of another embodiment of the present invention. In FIG. 8, the same reference numeral is allocated to a part having the same configuration as that shown in FIGS. 2 and 3.

In this example, a battery 56 is fixed in a state in which a part is exposed from the swing arm 30.

More specifically, housing space 35 is pierced in a direction in which the battery is inserted by cutting off the vicinity of its bottom on the side of an end as a cutout 38b along a cutting line connected to a curved part 40 on the opposite side to the side of an opening in a wide case 38 inside which the housing space 35 is formed.

Next, a method of fixing in a state in which a part of the battery 56 is exposed out of the housing space 35 will be described.

First, a potting cover in the same shape as the cutout 38b is installed on the pierced part of the housing space 35 and the inside of the housing space 35 is sealed. The potting cover may be also formed by the same material as the swing arm 30 and may be also formed by another material.

In this state, as in the above-mentioned example, the battery 56 is inserted into the housing space 35 from the side of the opening by engaging each battery cell of the battery 56 with a guide groove 44.

Next, potting material having flowability is injected from a circumference in the housing space 35 and the injected potting material is hardened. After the potting material is hardened, the potting cover used for sealing the housing space 35 is detached. The end of the battery 56 is exposed from the housing space 35 of the swing arm 30, however, its position is fixed by the potting material. In addition, the side of the end of the battery 56 exposed from the housing space 35 is protected by the coating of the potting material.

According to this structure, the battery 56 can be integrated with the swing arm 30 by covering the battery 56 with the potting material and the weight can be reduced by cutting off a part of the swing arm 30 (forming the cutout 38b).

In addition, the effect of heat radiation of the battery 56 can be enhanced by exposing a part of the battery 56 from the swing arm 30.

As for a part at the end of the battery 56 exposed from the housing space 35, the part may be also covered with a cover produced by a lighter part than material configuring the swing arm 30.

The part at the end exposed from the housing space 35 of the battery 56 can be securely protected by covering the part at the end with the light cover having the same shape as the cutout 38b and the weight can be reduced, compared with structure where no cutout 38b is provided to the housing space 35.

Figure 9:
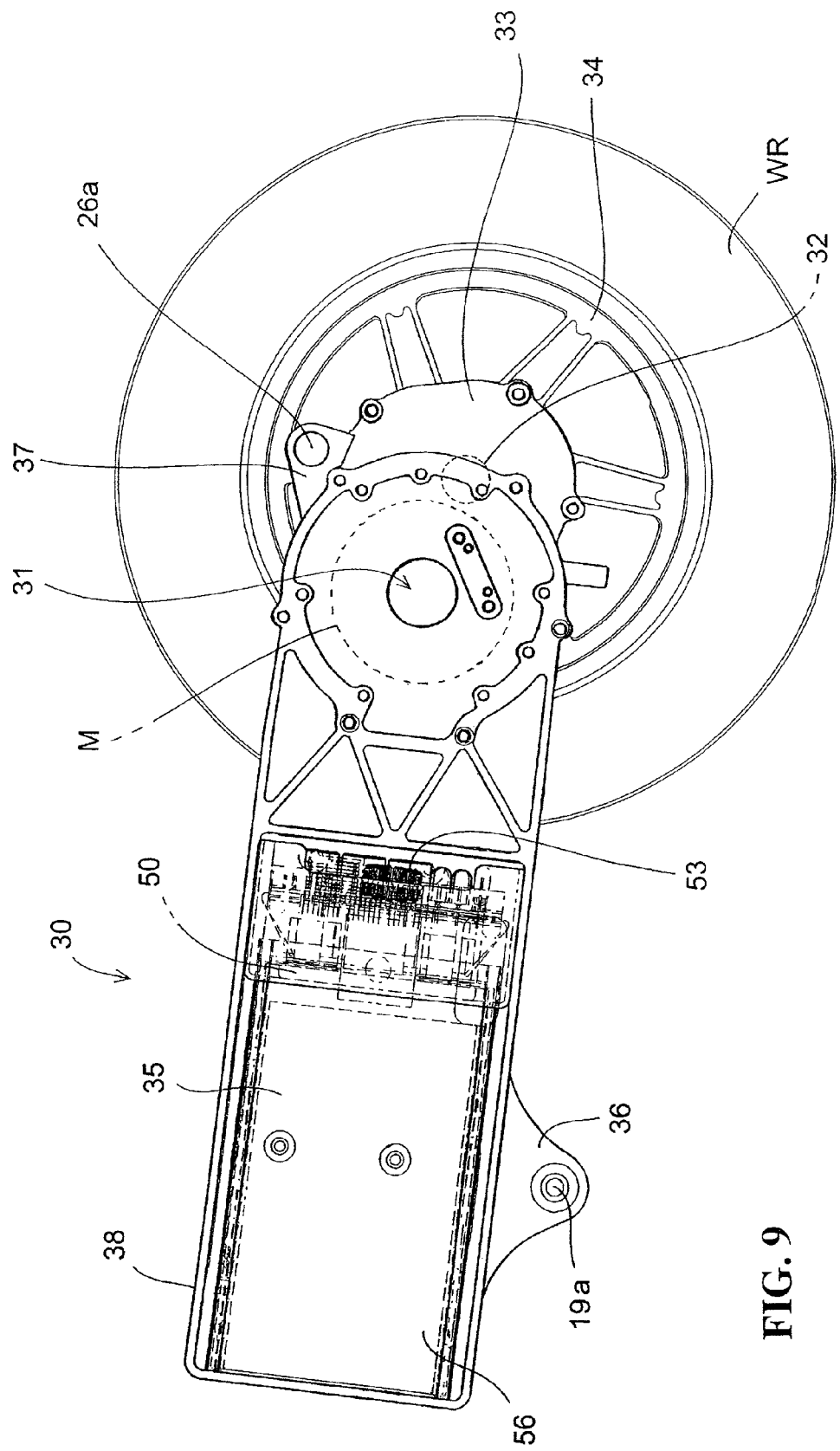
FIG. 9 shows another embodiment of the battery for the electric vehicle according to the present invention and is a left side view showing a swing arm in which a battery for an electric vehicle is arranged.
Figure 10:
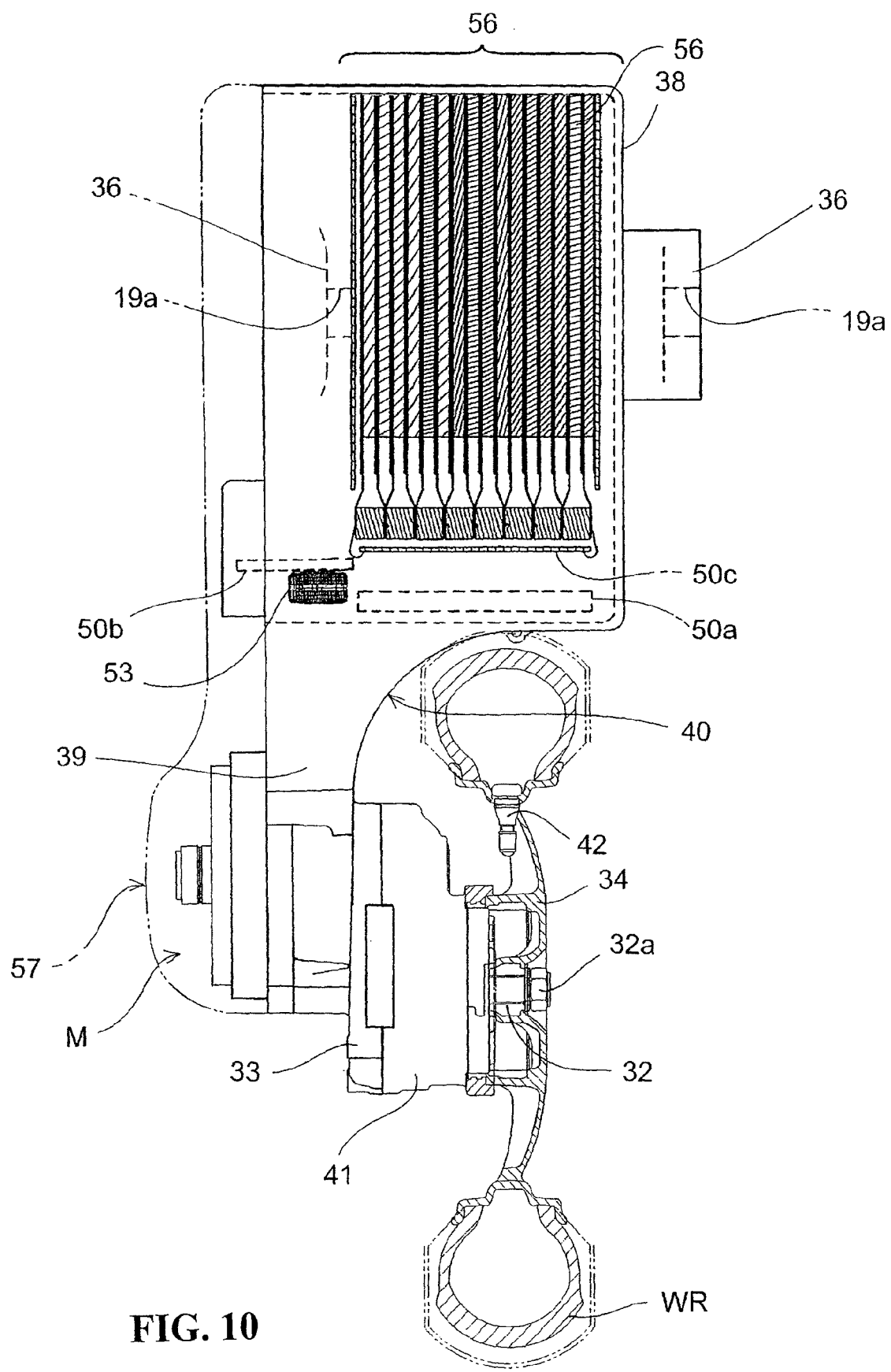
FIG. 10 is a top view showing the swing arm in which the battery for the electric vehicle shown in FIG. 9 is arranged.

FIGS. 9 and 10 show an example of another embodiment of the present invention. In FIGS. 9 and 10, the same reference numeral is allocated to a part having the same configuration as the part shown in FIGS. 2 and 3.

More specifically, in the example of the battery for the electric vehicle shown in FIGS. 2 and 3, the board 50 is arranged on the side of the swing arm 30 by inserting the battery 56 into the housing space 35 from the side, however, in the example shown in FIGS. 9 and 10, a battery 56 can be inserted from the side of a top face or from the front side by arranging an opening of housing space 35 on the top face or at the front (on the side of a front wheel WF), and a board 50 is arranged on the back. The width of a swing arm 30 can be reduced by directing a longer side of a battery cell in the shape of a rectangle in a longitudinal direction in the battery 56.

According to this configuration, as the board 50 can be arranged on the rearmost face of the housing space 35, the number of parts such as wiring can be reduced by arranging parts related to an electric motor M as closely as possible and besides, a wiring path between the battery 56 and the electric motor M can be reduced.

When the opening of the housing space 35 is located on the side of the top face of the electric vehicle and the battery 56 can be inserted via the opening, the mounting of the battery is facilitated by providing the housing space 35 equipped with the opening on the upside because a normal battery case which has been used is in a shape that the battery is not inserted from the upside, the swing arm can replace a part equivalent to the conventional type battery case, and the replacement can contribute to the reduction of the number of parts and the weight.

According to the above-mentioned configuration of the battery for the electric vehicle, a dedicated case for holding the battery 56 is not required, the reduction of the number of parts and the weight are enabled by utilizing the swing arm 30 itself for the case for holding the battery 56, securely fixing the battery 56 to the swing arm 30.

As the heavy battery 56 has a structure that it can be built from the rear side, the swing arm 30 is not required to be partially overhanged in accordance with the shape of the battery 56, enhancing the ease of assembly of the vehicle and the battery can be securely fixed to the swing arm 30, contributing to the reduction of the number of parts and the weight.

As the swing arm 30 can be used for a radiator by directly fixing the battery 56 to the swing arm 30, effect in cooling the battery 56 can be enhanced.

In addition, the whole battery unit can be compacted by simplifying structure for mounting the battery 56 and a degree of freedom in the design of another configuration such as the arrangement of electric equipment can be enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery for an electric vehicle installed to supply electric power to an electric motor in the electric vehicle provided with a swing arm one end of which is coupled to a swinging shaft and the other end of which supports a rear wheel and the electric motor that is installed on the side of the other end of the swing arm and drives the rear wheel, wherein the swing arm is provided with:
- a housing space provided to the swing arm in the vicinity of the swinging shaft;
- a guide groove that positions the battery in the housing space, wherein the battery is mounted in the swing arm by fixing the battery positioned in the housing space via potting material; and
- a relief passage for relieving high pressure inside the housing space to outside of the housing space, wherein the relief passage is surrounded by the potting material.

2. The battery for the electric vehicle according to claim 1, wherein the battery is configured by a plurality of rectangular plate-like battery cells, and the guide groove in the housing space is provided every cell.

3. The battery for the electric vehicle according to claim 2, wherein the plurality of battery cells configuring the battery are arranged with each longer side vertically directed.

4. The battery for the electric vehicle according to claim 1, wherein the relief passage is formed by engaging a sealing plug with a through hole bored in the housing space and removing the sealing plug after the potting material is injected into the housing space.

5. The battery for the electric vehicle according to claim 1, wherein the potting material is resin.

6. The battery for the electric vehicle according to claim 5, wherein the resin is resin coating, and the battery is press-fitted and fixed in the resin coating.

7. The battery for the electric vehicle according to claim 1, wherein the housing space of the swing arm is provided with an opening on the upside.

8. The battery for the electric vehicle according to claim 1, wherein the battery is configured by an aggregate of laminated battery cells packaged every cell.

9. A battery for an electric vehicle installed to supply electric power to an electric motor in the electric vehicle provided with a swing arm one end of which is coupled to a swinging shaft and the other end of which supports a rear wheel and the electric motor that is installed on the side of the other end of the swing arm and drives the rear wheel, wherein the swing arm is provided with:
- a housing space provided to the swing arm in the vicinity of the swinging shaft; and
- a guide groove that positions the battery in the housing space,
- wherein the battery is mounted in the swing arm by fixing the battery positioned in the housing space via potting material, and
- wherein a board is arranged in the vicinity of the swing arm, the board is configured by a control board for mainly controlling the electric motor or a heating element board provided with a charging circuit for mainly charging the battery, and the board is fixed by the potting material.

10. The battery for the electric vehicle according to claim 9, wherein the board is arranged on the side or on the back of the swing arm.

11. The battery for the electric vehicle according to claim 9, wherein the board is fixed to the battery, and the board is arranged in the vicinity of the swing arm.

12. The battery for the electric vehicle according to claim 9, wherein the heating element board is fixed to the control board on the rear side in a vehicle body of the control board, the control board and the heating element board are encircled by the potting material, and a part of exothermic members on the heating element board is exposed out of the potting material.

13. A battery for an electric vehicle installed to supply electric power to an electric motor in the electric vehicle provided with a swing arm one end of which is coupled to a swinging shaft and the other end of which supports a rear wheel and the electric motor that is installed on the side of the other end of the swing arm and drives the rear wheel, wherein the swing arm is provided with:
- a housing space provided to the swing arm in the vicinity of the swinging shaft; and
- a guide groove that positions the battery in the housing space,
- wherein the battery is mounted in the swing arm by fixing the battery positioned in the housing space via potting material, and
- wherein:
    - said housing space is provided with an opening for inserting the battery on the side of the electric vehicle; and
    - said battery is inserted and fixed into or to the housing space of the swing arm from the side of electric vehicle.

14. The battery for the electric vehicle according to claim 13,
- wherein the housing space is provided with a cutout from which an end of the battery is exposed on the opposite side to the opening; and
- the battery is fixed in the housing space in a state in which a part of the battery is exposed from the swing arm.

15. The battery for the electric vehicle according to claim 14, wherein a cover formed by a lighter part than the material of the swing arm is installed in place of the cutout of the housing space.

16. The battery for the electric vehicle according to claim 13, wherein the potting material is resin.

17. The battery for the electric vehicle according to claim 13, wherein the resin is resin coating, and the battery is press-fitted and fixed in the resin coating.

18. The battery for the electric vehicle according to claim 13, wherein the battery is configured by a plurality of rectangular and plate-like battery cells, and each cell is arranged with a longer side vertically directed.

19. The battery for the electric vehicle according to claim 13, wherein the battery is configured by the aggregate of laminated battery cells packaged every cell.

20. The battery for the electric vehicle according to claim 13, wherein the board is configured by a control board that mainly controls the electric motor and a heating element board provided with a charging circuit for mainly charging the battery, the battery and the board are integrated, and they are inserted and fixed into/to the swing arm in an integrated state.

* * * * *